United States Patent [19]

Dippold

[11] 4,134,009

[45] Jan. 9, 1979

[54] MAGNETIC FOCUSED MICROCHANNEL PLATE IMAGE INTENSIFIER HAVING DYNAMIC RANGE ENHANCEMENT

[75] Inventor: Walter J. Dippold, Pinckney, Mich.

[73] Assignee: International Telephone & Telegraph Corp., Nutley, N.J.

[21] Appl. No.: 805,956

[22] Filed: Jun. 13, 1977

[51] Int. Cl.[2] .............................................. G01J 1/32

[52] U.S. Cl. .............................. 250/205; 250/213 VT

[58] Field of Search ............ 250/205, 213 R, 213 VT

[56] References Cited

U.S. PATENT DOCUMENTS

| | | | |
|---|---|---|---|
| 3,666,957 | 5/1972 | Wyess | 250/213 VT |
| 3,739,178 | 6/1973 | Chow | 250/213 VT |
| 3,934,170 | 1/1976 | Enck et al. | 250/213 R |

*Primary Examiner*—M. Tokar

*Attorney, Agent, or Firm*—John T. O'Halloran; Alfred C. Hill

[57] ABSTRACT

The dynamic range enhancement of the image intensifier is provided by an electrically conductive membrane or mesh which is disposed within the intensifier between the photocathode and the microchannel plate and a pulse width modulator to provide a control signal proportional to the light level adjacent the output window of the intensifier to provide a control signal for the membrane or mesh to control the electron image from the photocathode.

13 Claims, 1 Drawing Figure

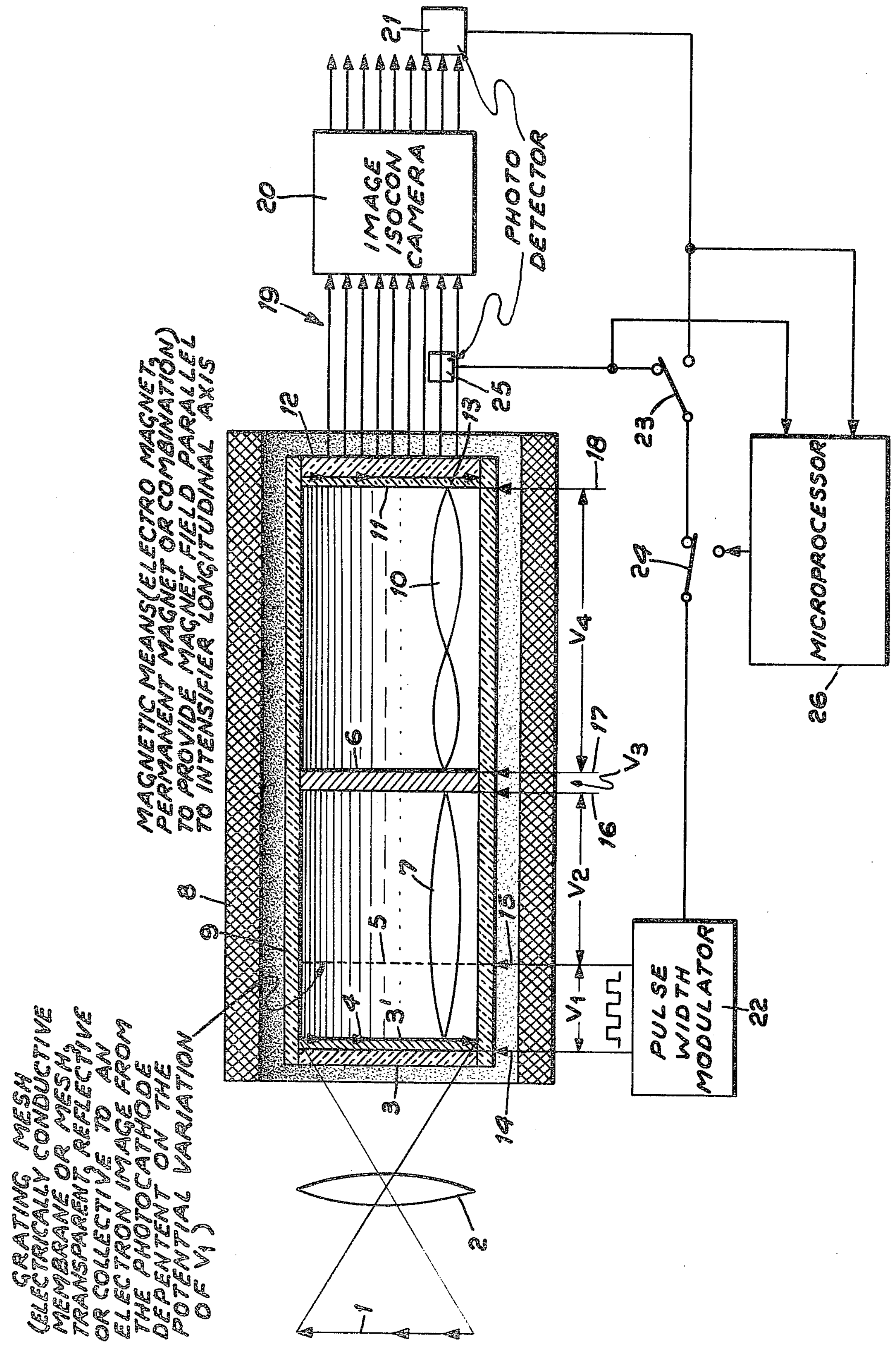
GRATING MESH (ELECTRICALLY CONDUCTIVE MEMBRANE OR MESH, TRANSPARENT, REFLECTIVE OR COLLECTIVE) TO AN ELECTRON IMAGE FROM THE PHOTOCATHODE DEPENTENT ON THE POTENTIAL VARIATION OF V1)
MAGNETIC MEANS (ELECTRO MAGNET, PERMANENT MAGNET OR COMBINATION) TO PROVIDE MAGNET FIELD PARALLEL TO INTENSIFIER LONGITUDINAL AXIS
IMAGE ISOCON CAMERA
PHOTO DETECTOR
MICROPROCESSOR
PULSE WIDTH MODULATOR
V1
V2
V3
V4
1
2
3
3'
4
5
6
7
8
9
10
11
12
13
14
15
16
17
18
19
20
21
22
23
24
25
26

MAGNETIC FOCUSED MICROCHANNEL PLATE IMAGE INTENSIFIER HAVING DYNAMIC RANGE ENHANCEMENT

BACKGROUND OF THE INVENTION

This invention relates to image intensifiers and more particularly to magnetic focused microchannel plate image intensifiers.

Like most television pickup tubes, the RCA Image Isocon can accept only a limited range of light levels in its optical image before an effect called "blooming" sets in. This effect if allowed to increase without limit, destroys the ability of the pickup tube to present an intelligible image to the viewer.

One requirement of users of television pickup systems is to have a television pickup system with day-night operational capabilities. Insertion of filters, lens aperturing and/or removal of the preamplifier image tube are permissible methods of accomplishing the day-night operational range capability. The conversion speed of mode change from day to night and night to day are drawbacks under the above possible methods, even under controlled conditions. For enemy countermeasure conditions, the interchange between day and night is far too slow to protect the television pickup system from destruction.

SUMMARY OF THE INVENTION

An object of the present invention is to provide a gated, magnetically focused image tube as a preamplifier image tube to compensate for the Image Isocon weakness in the blooming area.

Another object of the present invention is to provide an electronic adjustment to accommodate the wide day-night dynamic range and to override and protect the system from countermeasure tactics.

A feature of the present invention is the provision in a magnetic focused microchannel plate image intensifier including an optically transparent input faceplate, a photocathode in contact with the faceplate, a microchannel plate spaced axially along the intensifier from the photocathode, a phosphor screen disposed adjacent the output of the intensifier and an output window in contact with the screen, an arrangement to enhance the dynamic range of the intensifier comprising: gating means disposed within the intensifier between the photocathode and the microchannel plate; and means external of the intensifier coupled to the gating means and disposed adjacent the output window to provide a control signal proportional to light level adjacent the output window to control an electron image from the photocathode by the gating means to achieve enhancement of the dynamic range of the intensifier.

BRIEF DESCRIPTION OF THE DRAWING

Above-mentioned and other features and objects of this invention will become more apparent by reference to the following description taken in conjunction with the accompanying drawing, in which the sole FIGURE is a block diagram and a schematic longitudinal cross section of the magnetic focused microchannel plate image intensifier having an enhanced dynamic range in accordance with the principles of the present invention.

DESCRIPTION OF THE PREFERRED EMBODIMENTS

A scene 1 illuminated by a light source (not shown) from $10^{-4}$ to $10^4$ foot candles. Optical system 2 focuses the optical image of the scene 1 onto the photocathode 3'. The input face plate 3 which may be optically transparent glass or crystal or fiber optics, etc., with a vacuum integrity with vacuum envelope 9 greater than $10^{-10}$ cc/second (cubic centimeters per second). The optical image 4 of scene 1 appears on the photoemissive surface of the photocathode 3'. Gating mesh 5 is an electrically conductive membrane or mesh which is transparent, reflective or corrective to an electron image from photocathode 3', dependent on the potential variation of voltage $V_1$ which is a square wave control signal for gating mesh 5, whose pulse width is directly proportional to the light level adjacent the output window 12 of the intensifier. Microchannel plate 6 or other transmission secondary emission membrane with a multiplication gain characteristic which is a function of electron input density in time and space is spaced from gating mesh 5. Electromagnetic focus loop 7, showing nodes at the photocathode 3' and at the input to the microchannel plate 6 with the gating mesh 5 in the region of an antinode to prevent focusing gating mesh 5 on the microchannel plate. More than one loop, however, is permissible. Magnetic means 8 which may be electromagnets, permanent magnets, or a combination thereof, provides a uniform magnetic flux focus field parallel to the longitudinal axis of the intensifier. Magnetic means 8 is compensated for non-uniformity with auxiliary magnetic fields and voltage adjustments as required to offset technology limitations which prevent a truly uniform field initially. Vacuum envelope 9 has a vacuum integrity greater than $10^{-10}$ cc/second and has sufficient insulation characteristics to allow potentials $V_1$, $V_2$, $V_3$ and $V_4$ to be applied to their appropriate elements within envelope 9. Electron magnetic focus loops 10 have a first node at the microchannel plate 6 output, a second node at phosphor screen 11 input and a third node between the first and second nodes. One or more loops are acceptable depending on the magnetic flux density and the potential $V_4$ applied. Phosphor screen 11 includes phosphor material disposed on an optically transparent window, generally having a reflective overcoating of aluminum to direct the phosphorescent light out through the output window 12 and to prevent light from entering the vacuum space. Output window 12 can be formed of optically transparent glass, or crystal or fiber optics, etc., with a vacuum integrity with envelope 9 greater than $10^{-10}$ cc/second. Optical image 13 has a similar scale and orientation to the optical image 4. In a normal image tube without a gating mesh 5, the image would be intensified. In the tube of the present invention the image may be intensified or attenuated and the gray scale of a scene will be compressed and limited by the saturation characteristics of the microchannel plate 6. Conductor 14 provides an electrical connection for the operating potential of the photocathode 3'. Conductor 15 provides the input for the control signal to the gating mesh 5. Conductor 16 provides an electrical connection for the operating potential for the input of the microchannel plate 6. Conductor 17 provides operating potential to the output of the microchannel plate. Conductor 18 provides operating potential to the phosphor screen 11. Potential $V_1$ is the electrical potential between photocathode 3' and the gating mesh 5. Potential $V_2$ is the electrical potential between gating mesh 5 and the input to the microchannel plate 6. Potential $V_3$ provides the operating potential between the input and output of the microchannel plate 6. Potential $V_4$ provides the operating potential between the output of the microchannel plate 6 and the phosphor screen 11.

The image of the illuminated scene 1 in each case is focused on the photocathode 3' of the image intensifier by optical lens system 2. This gated and magnetic focused image intensifier from that point on has special characteristics designed into it to compensate for the blooming weakness of the Image Isocon television pickup tube or camera 20.

The weakness compensation is done by the compression of the abnormal high light in the scene with gain saturation in the microchannel plate 6. Operating the specially processed microchannel plate 6 in this mode to prevent blooming of the Image Isocon camera 20, however, limits the dynamic range (scene light levels which can be intelligibly viewed) of the image tube system to several orders of magnitude at the lowest light levels beginning at the threshold light of operation.

Operation in the low light level mode is established by the tube design and applied potential $V_1$ so that the gating mesh 5 appears as not to be in the image tube. Potential $V_1$ is set to a steady state value such that potential $V_1$ divided by the distance between the photocathode 3' and the gating mesh 5 is equal to potential $V_2$ divided by the distances between the gating mesh 5 and the input to the microchannel plate 6. This electric field (voltage divided by distance) and the magnetic flux density are adjacent to produce one or more complete focus loops to present the electron image from the photocathode 3' to the microchannel plate 6. The potential $V_3$ across the microchannel plate 6 is adjusted to gain saturation at high light levels which would begin to cause blooming in the Image Isocon camera 20. The potential $V_4$ divided by the distance between microchannel plate 6 output and the phosphor screen 11 input is adjusted relative to the magnetic flux density established as pointed out hereinabove so that one or more complete focus loops presents the electron image from the microchannel plate 6 output to phosphor screen 11 in focus. Bombardment of the phosphor screen 11 with a variable density electron image produces from the phosphor a variable density light image. The light image is transmitted to the photocathode of the Image Isocon camera 20 by a coupling of fiber optic faceplates or by an optical relay lens system schematically illustrated as lines 19.

When the light level on scene 1 is great enough so that the preamplifier image intensifier operating in the low light level mode begins to cause the Image Isocon camera 20 to bloom, it is time to bring in the operation of gating mesh 5. This is done by changing the voltage $V_1$ from a steady state DC (direct current) to a pulsing potential. The pulse repetition rate is synchronous with the vertical or horizontal blanking or scanning pulses of camera 20 depending on the option chosen by the system designer. If the gating pulses are chosen positive and referenced negative to the photocathode 3', the pulse repetition rate is to be synchronous with the blanking pulses with a maximum width equal to the blanking pulse width. The pulse would gate the preamplifier image intensifier on with a maximum amplitude pulse equal to voltage $V_1$ in the low light level mode. The pulse would gate the preamplifier image intensifier on during the retrace time of the Image Isocon camera 20.

If voltage $V_1$ is referenced positive as in the steady state condition for the low light level mode, the pulse and repetition rate is synchronous with the scanning pulse of the Image Isocon camera 20. Under this condition the preamplifier image intensifier of the present invention would be on unless gated off. However, the maximum on time for a uniform display is with a minimum pulse width equal to the horizontal scanning time and a pulse repetition rate equal to the horizontal scanning frequency of camera 20.

A blooming detection signal from the Image Isocon camera 20 is detected by photodetector 21. The electrical signal proportional to the light level at the output of detector 21 is fed to the pulse width modulator 22 through switch 23 when in the position opposite to that illustrated and switch 24 is in the position illustrated. As a result thereof, the pulse width output of modulator 22 increases, under the last condition mentioned hereinabove, as the light level to the Image Isocon camera 20 increases. An increased pulse width to the gating mesh 5 decreases the on time of the preamplifier image intensifier thereby decreasing the average brightness seen by the Image Isocon camera 20.

An alternate method is to sample the light level at the output of the preamplifier image intensifier by photodetector 25 and control the pulse width of modulator 22 output when switches 23 and 24 are in the position illustrated. The light level of the preamplifier image intensifier at the output of output window 12 anticipates the light output level of the Image Isocon camera 20 and is a better method in counteracting countermeasure tactics. On the other hand, it may not let the Image Isocon camera 20 reach maximum contrast unless the control arrangement is carefully calibrated.

A better but more complicated system to control gating mesh 5 is to use both the signals from detectors 21 and 25 and a microprocessor 26 which is coupled through switch 24 in the position opposite to that illustrated to control modulator 22. Microprocessor 26 averages the inputs from photodetectors 21 and 25 but is programmed to handle countermeasure transients.

The self protective mode is protection for the photoemissive surface of photocathode 3' in case of countermeasure tactics or the turning of the system toward the sun during daylight operation. The operation of the preamplifier image intensifier is the same as in the high light level mode except that the pulse width now goes to the maximum (steady state off). Photocathodes are damaged first by extremes of current density. The damage level being dependent on photocathode emissive surface sensitivity and substrate material. Gating the photocathode off for the extremes of high light level exposure prevents the first damage cycle.

The second damage cycle is from the heating effect of the high light level. This mode is much slower in most cases, with the exception of a high intensity laser beam and corrective action can be taken to avoid permanent damage if a warning signal is provided.

The gated off mode coupled with the light attenuation of the microchannel plate 6 and the aluminized phosphor screen 11 protects the Image Isocon camera 20 from photocathode damage. The level of light attenuation between the scene and the Image Isocon camera 20 being approximately $1 \times 10^8$ (neutral density of 8).

Special design and technology required for the image intensifier of the present invention outside of the normal interface parameters such as length, diameter and operating magnetic flux density are:

(1) mesh 5 spacing, (2) microchannel plate 6 processing, and (3) photocathode 3' processing.

The mesh spacing requirement is controlled first by the need to have the mesh 5 far enough away from the photocathode 3' surface toward the first antinode so that mesh 5 is not focused on the input of the microchannel plate 6. The second requirement is a trade off in spacing distance and weighing capacitance with gating potential amplitude requirements. The impact on the pulse generating and processing module to drive the gating mesh 5 is that a tight spacing allows lower gating voltages but requires high transient current to charge the high capacitance. Wider mesh 5 spacing reduces the capacitance but increases the voltage required for cut-off.

The normal microchannel plate process for maximum dynamic range (within a reasonable gain) at a voltage set point which can be further enhanced by voltage variation about the set point.

The optimum microchannel plate 6 for this application would compress the dynamic range by 50% or more compared with the optimum microchannel plate made for direct view applications. This change is made through process adjustment and control in manufacturing and enhanced by the operating potential applied across the input to output of the microchannel plate 6 establishing a somewhat fixed and non-arbitrary set point. The processing establishes the gain characteristic and the potential establishes the high light compression characteristics through the microchannel plate 6 gain variation as a function of voltage.

The image intensifier of the present invention requires the photocathode 3' be remotely processed from tube envelope 9 containing the gating mesh 5 and then transferred and sealed to tube envelope 9 in vacuum. In situ processing of the photocathode 3' would put photoemissive material on the gating mesh 5. The effect of these materials on mesh 5 in the low light level mode would be non-focused photoemission from the mesh 5 accelerated to the microchannel plate 6 causing background illumination (noise) with the desired image. During the gated off mode, the photocathode image would be cut off as required but the photoemission from the gating mesh 5 would continue to generate background noise. In a worse case, the mesh 5 could be in focus on the microchannel plate 6 (depending on the gating voltage) and if so, it would be presented to the Image Isocon camera 20 as a bright line pattern when a dark field is required.

Processing photocathode 3' remotely and transferring the finished product to the tube envelope 9 keeps mesh 5 free of photoemissive materials and prevents the aforementioned operating mode noises.

While I have described above the principles of my invention in connection with specific apparatus it is to be clearly understood that this description is made only by way of example and not as a limitation to the scope of my invention as set forth in the objects thereof and in the accompanying claims.

I claim:

1. In a magnetic focused microchannel plate image intensifier including an optically transparent input faceplate, a photocathode in contact with said faceplate, a microchannel plate spaced axially along said intensifier from said photocathode, a phosphor screen disposed adjacent the output of said intensifier and an output window in contact with said screen, an arrangement to enhance the dynamic range of said intensifier comprising:
   - gating means disposed within said intensifier between said photocathode and said microchannel plate; and
   - means external of said intensifier coupled to said gating means and disposed adjacent said output window to provide a control signal proportional to light level adjacent said output window to control an electron image from said photocathode by said gating means to achieve enhancement of the dynamic range of said intensifier.

2. An arrangement according to claim 1, wherein said control signal includes
   - a pulse width modulated signal whose pulse width is directly proportional to said light level.

3. An arrangement according to claim 2, wherein said gating means includes
   - an electrically conductive membrane which is transparent to said electron image for one set of values of said pulse width, reflective to said electron image for another set of values of said pulse width and collective of said electron image for a further set of values of said pulse width.

4. An arrangement according to claim 3, wherein said means includes
   - a photodetector adjacent said output window, and
   - a pulse width modulator coupled to said photodetector to produce said control signal.

5. An arrangement according to claim 3, wherein said means includes
   - an Image Isocon camera disposed adjacent said output window,
   - a photodetector disposed adjacent the output of said camera, and
   - a pulse width modulator coupled to said photodetector to produce said control signal.

6. An arrangement according to claim 3, wherein said means includes
   - a first photodetector disposed adjacent said output window,
   - an Image Isocon camera disposed adjacent said output window,
   - a second photodetector disposed adjacent the output of said camera,
   - a microprocessor coupled to said first and second photodetectors to average input signals from both of said first and second photodetectors and programmed to handle countermeasure transients, and
   - a pulse width modulator coupled to said microprocessor to produce said control signal.

7. An arrangement according to claim 2, wherein said gating means includes
   - an electrically conductive mesh which is transparent to said electron image for one set of values of said pulse width, reflective to said electron image for another set of values of said pulse width and collective of said electron image for a further set of values of said pulse width.

8. An arrangement according to claim 7, wherein said means includes
   - a photodetector adjacent said output window, and
   - a pulse width modulator coupled to said photodetector to produce said control signal.

9. An arrangement according to claim 7, wherein said means includes an Image Isocon camera disposed adjacent said output window, a photodetector disposed adjacent the output of said camera, and a pulse width modulator coupled to said photodetector to produce said control signal.

10. An arrangement according to claim 7, wherein said means includes a first photodetector disposed adjacent said output window, an Image Isocon camera disposed adjacent said output window, a second photodetector disposed adjacent the output of said camera, a microprocessor coupled to said first and second photodetectors to average input signals from both of said first and second photodetectors and programmed to handle countermeasure transients, and a pulse width modulator coupled to said microprocessor to produce said control signal.

11. An arrangement according to claim 2, wherein said means includes a photodetector adjacent said output window, and a pulse width modulator coupled to said photodetector to produce said control signal.

12. An arrangement according to claim 2, wherein said means includes an Image Isocon camera disposed adjacent said output window, a photodetector disposed adjacent the output of said camera, and a pulse width modulator coupled to said photodetector to produce said control signal.

13. An arrangement according to claim 2, wherein said means includes a first photodetector disposed adjacent said output window, an Image Isocon camera disposed adjacent said output window, a second photodetector disposed adjacent the output of said camera, a microprocessor coupled to said first and second photodetectors to average input signals from both of said first and second photodetectors and programmed to handle countermeasure transients, and a pulse width modulator coupled to said microprocessor to produce said control signal.

* * * * *